United States Patent
Monta et al.

[11] Patent Number: 5,161,006
[45] Date of Patent: Nov. 3, 1992

[54] METHOD FOR SEPARATING CHROMINANCE AND LUMINANCE COMPONENTS OF A TELEVISION SIGNAL

[75] Inventors: Peter A. Monta, Cambridge; Jae S. Lim, Winchester, both of Mass.; Kenneth A. Parulski, Rochester, N.Y.

[73] Assignee: Massachusetts Institute of Technology, Cambridge, Mass.

[21] Appl. No.: 558,607

[22] Filed: Jul. 26, 1990

[51] Int. Cl.$^5$ .............................. H04N 9/78
[52] U.S. Cl. ........................ 358/31; 358/11; 358/140
[58] Field of Search ............ 358/11, 31, 140, 186

[56] References Cited
U.S. PATENT DOCUMENTS

| | | |
|---|---|---|
| 421,152 | 10/1889 | Martinez et al. |
| 459,289 | 12/1889 | Lim |
| 4,530,004 | 7/1985 | Achiba et al. .................. 358/12 |
| 4,641,188 | 2/1987 | Dischert ......................... 358/140 |
| 4,709,277 | 11/1987 | Ninomiya et al. .............. 358/335 |
| 4,876,596 | 10/1989 | Faroudja ......................... 358/140 |
| 4,881,125 | 11/1989 | Krause ............................ 358/216 |
| 4,979,036 | 12/1990 | Smith et al. .................... 358/21 R |

OTHER PUBLICATIONS

"Improved NTSC to Achieve Near-RGB Performance", SMPTE Journal pp. 750-761 (Aug. 1987).
"Picture Coding: A Review", Proceedings of the IEEE pp. 366-406 (Mar. 1980).
Two Dimensional Signal and Image Processing, (1990), Prentice Hall.
Schreiber, William F., "Improved Television Systems: NTSC and Beyond," SMPTE Journal, vol. 66, No. 8 (Aug. 1987).
Schreiber, William F., "Psychophysics and the Improvement of Television Image Quality," SMPTE Journal, vol. 93, No. 8 (Aug. 1984).
Schreiber et al., "Reliable EDTV/HDTV Transmission in Low-Quality Analog Channels," SMPTE Journal, pp. 496-503 (Jul. 1989).

*Primary Examiner*—James J. Groody
*Assistant Examiner*—Kim Yen Vu
*Attorney, Agent, or Firm*—Fish & Richardson

[57] ABSTRACT

A method for decoding National Television System Committee (NTSC) signals which exploits redundancies in film-to-NTSC transcoding, known as "3-2 pull-down". The decoding method estimates luma (Y) and chroma (C). The "3-2 pull-down" structure assigns three NTSC fields to one frame of a film frame pair, and two NTSC fields to the other film frame. Luma and chroma in different film frames are separated using different methods, and the separated signals are better than the separated signals achieved using conventional one dimensional and two dimensional NTSC decoding methods. The new method for separating luma and chroma from composite NTSC signals can be combined with an interlace-to-progressive method, which converts the decoded 3-2 NTSC signals to 2 film frames, and an upconversion procedure, to yield improved image quality.

10 Claims, 5 Drawing Sheets

1D Y/C SEPARATION
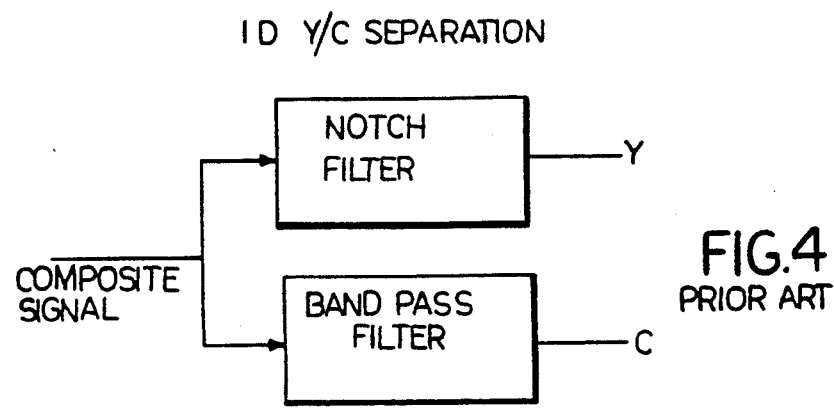
FIG.4
PRIOR ART
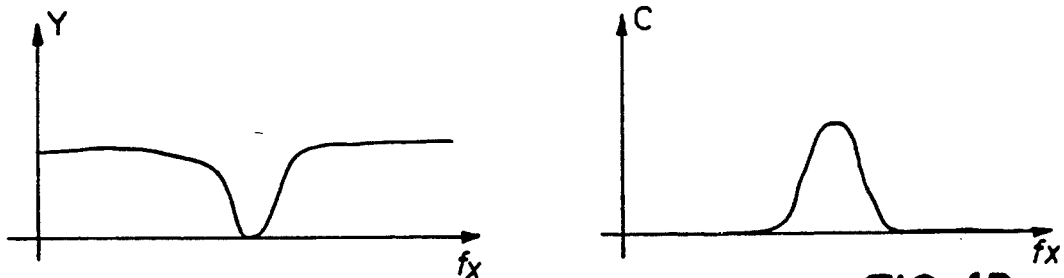
FIG.4A
PRIOR ART
FIG.4B
PRIOR ART
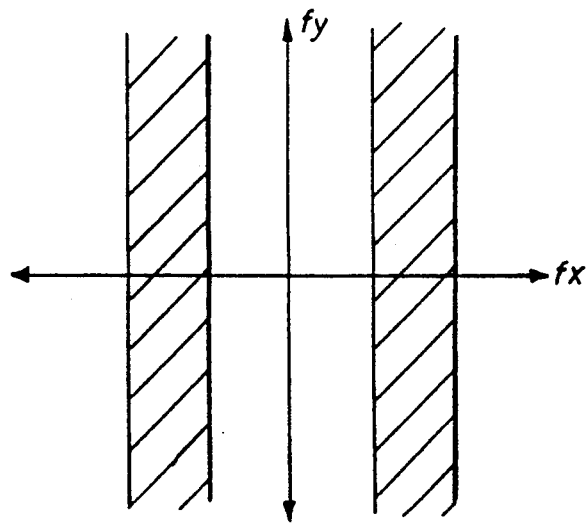
FIG.4C
PRIOR ART

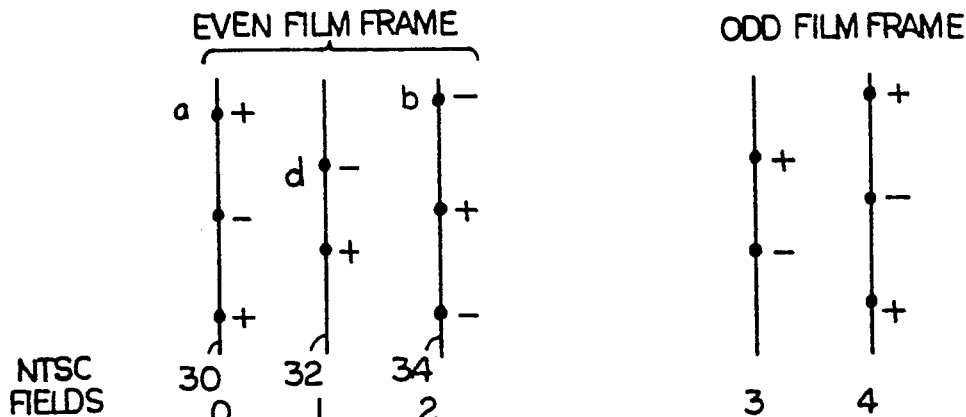
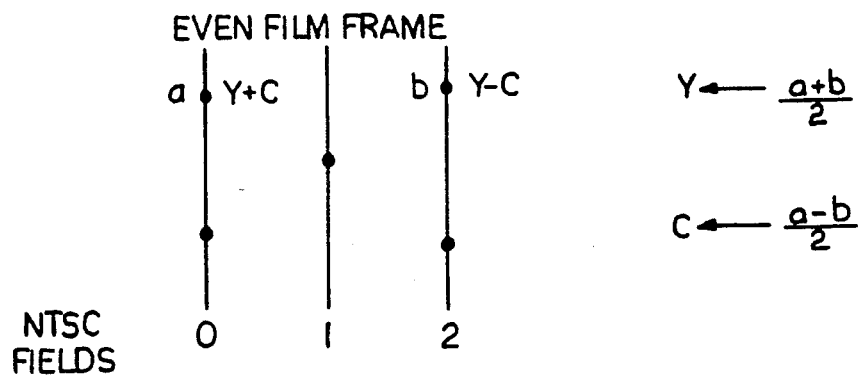
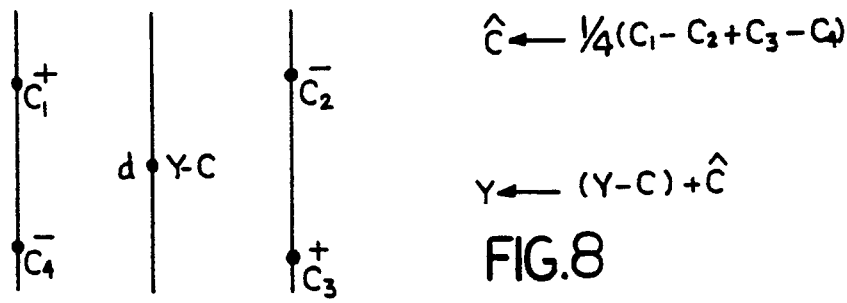
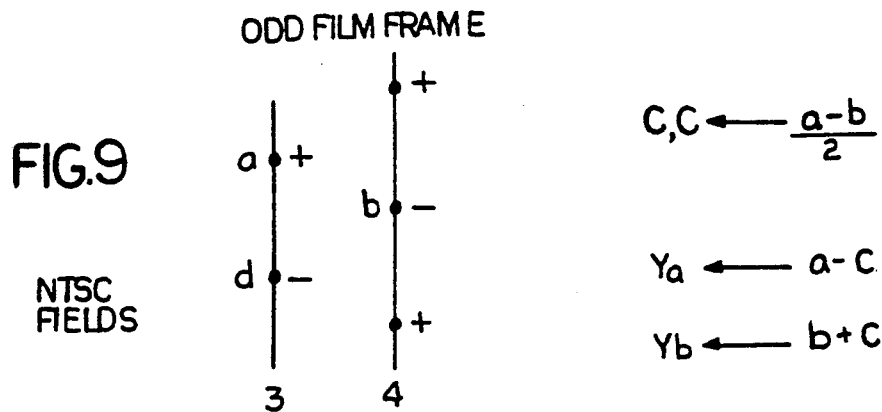

METHOD FOR SEPARATING CHROMINANCE AND LUMINANCE COMPONENTS OF A TELEVISION SIGNAL

BACKGROUND OF THE INVENTION

This invention relates to decoding of television signals, and particularly to separation of chrominance and luminance in such decoding.

Separation of chrominance (chroma) and luminance (luma) in conventional television transmissions (e.g., NTSC, PAL, SECAM) is not an easy task because the two signals share spectrum. Typically, the separation is performed using one or two-dimensional bandpass filtering.

When film material, which is recorded at 24 frames/second, is converted for television transmission, which uses different rates (e.g., 30 frames/second, or 60 fields/second, for NTSC), it is conventional to generate successive fields of the television signal from the same frame of the film material. In the case of NTSC transmission, the conventional conversion technique is known as "3-2 pull-down"; each pair of film frames is transformed to five NTSC fields; three NTSC fields are generated from one film frame, and two from the other.

SUMMARY OF THE INVENTION

The invention takes advantage of the inherent redundancy in television transmissions encoded using such film-to-television conversion techniques, to provide improved separation of chrominance and luminance. Separation of a desired component (e.g., chroma) is performed by arithmetically combining fields based on the same film frame in such a manner as to cancel or reduce contributions from the other component (e.g., luma), thereby leaving predominantly the desired component. A second arithmetic combination can be used to separate the other component.

In preferred embodiments, the technique is used with NTSC transmissions in which film has been encoded using the 3-2 pull-down technique. For the case of three successive NTSC fields being based on one film frame, chrominance is generated for lines of the first and third fields by forming the difference between corresponding lines from the first and third fields, and for the second field by interpolation from the chrominance generated for nearby lines in the first and third fields. Similarly, the luminance component for lines of the first and third fields is formed by summing signals from the first and third fields, and for lines of the second field by adding to those lines the chrominance interpolated for the lines. For the two-field case, the chrominance component is approximated for lines of both fields as the difference between signals for nearby lines in different fields, and the luminance component is approximated by removing from any given line the approximated chrominance component.

The invention improves the quality of NTSC television images without increasing the amount of information to be transmitted or recorded. Fewer cross-luma and cross-chroma effects are produced than with conventional one dimensional or two dimensional NTSC decoding.

Other features and advantages of the invention will be apparent from the following description of the preferred embodiments, and from the claims.

DESCRIPTION OF THE PREFERRED EMBODIMENT

FIG. 4 is a block diagram of a conventional one dimensional luma (Y) and chroma (C) separation scheme.

FIG. 4A is the frequency response of a one dimensional notch filter used to recover luma.

FIG. 4B is the frequency response of a one dimensional bandpass filter used to recover chroma.

FIG. 4C is the two dimensional spatial frequency response of the bandpass filter used in FIG. 4B for recovering chroma.

FIG. 7 is a diagrammatic representation of five NTSC fields corresponding to a pair of film frames in a "3-2 pull-down" NTSC signal.

FIG. 8 shows the method used in the invention to separate luma and chroma for the three NTSC fields of a "3-2 pull-down" pair.

FIG. 9 shows the method used in the invention to separate luma and chroma for the two NTSC fields of a "3-2 pull-down" pair.

Figure 1:
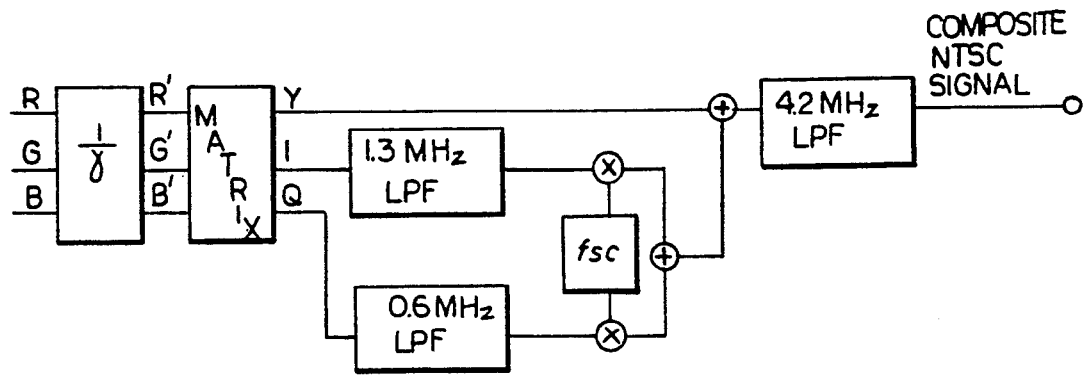
FIG. 1 is a block diagram of a conventional NTSC encoder.

Before describing the preferred embodiment, it is instructive to review conventional methods for encoding and decoding NTSC signals, and for converting 24 frames/sec film to NTSC. A conventional NTSC encoder is shown in FIG. 1. A nonlinearity ("gamma correction") is applied to the Red/Green/Blue (RGB) signal (e.g., from a camera, film scanner, etc.) to approximately linearize the light sensor. The signal is mapped to the YIQ color space with the Y component representing luminance ("luma") and the I and Q components, known as color-difference signals, representing chrominance ("chroma"). The color-difference signals I and Q are band limited; the I signal is lowpass-filtered to 1.3 MHz, and the Q signal to 0.6 MHz. The two color-difference signals are then quadrature modulated on a "color subcarrier". The luminance is added to the resulting chrominance signal, and the composite signal is lowpass-filtered to 4.2 MHz.

Figure 2:
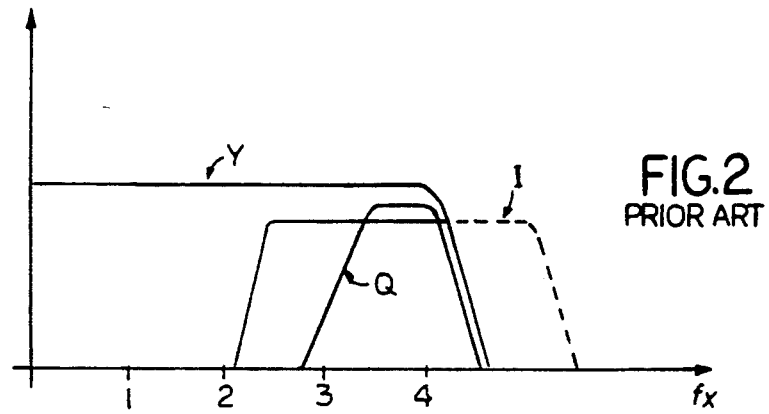
FIG. 2 is a one dimensional spectrum of the NTSC composite signal.

FIG. 2 shows a one dimensional (1D) spectrum of the NTSC composite signal. I and Q are shifted in frequency by the modulation, and part of the I sideband is removed by the final filter.

Figure 3:
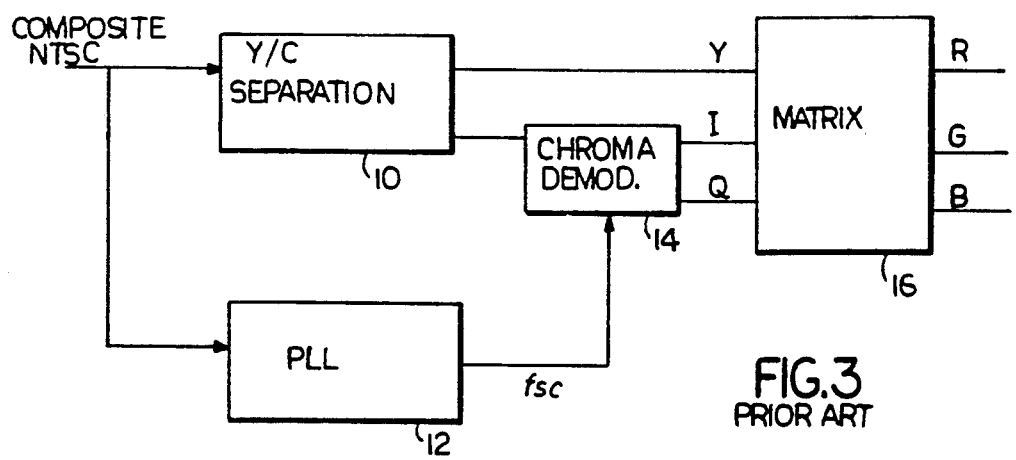
FIG. 3 is a block diagram of a conventional NTSC decoder.

As shown in FIG. 3, an NTSC signal is decoded by first separating luminance and chrominance, then demodulating the chrominance into baseband I and Q signals. The color subcarrier is recovered from the composite signal by a phase-locked loop. The YIQ signal is then transformed to RGB (the color picture is reproduced by combining correct proportions of red, green and blue) and displayed.

Separation of the luminance and chrominance signals is not an easy task because the two signals share spectrum, thus making the process of adding the two signals irreversible. The simplest and the least expensive separation algorithm is purely one-dimensional. Luma is recovered using the simple notch filter shown in FIG. 4A to remove the chroma. Chroma is recovered using the bandpass filter shown in FIG. 4B. Both filters are centered around the color subcarrier. FIG. 4C shows the two dimensional spatial frequency response of the band-pass filter of FIG. 4B. One dimensional filtering produces cross-effects that are manifested as "crawling dots" and "rainbow" artifacts.

Figure 5:
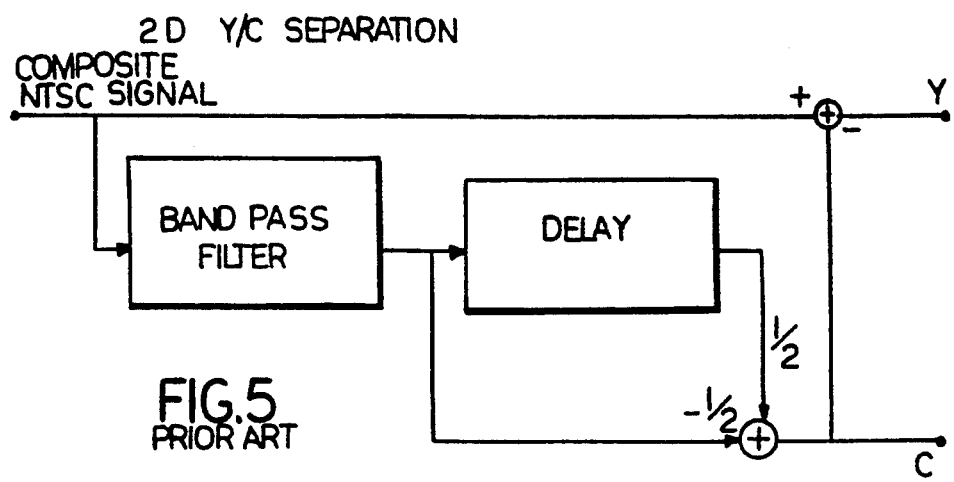
FIG. 5 is a block diagram of a conventional two dimensional luma (Y) and chroma (C) separation scheme using a horizontal bandpass filter followed by a 2-tap vertical "comb filter".
Figure 5A:
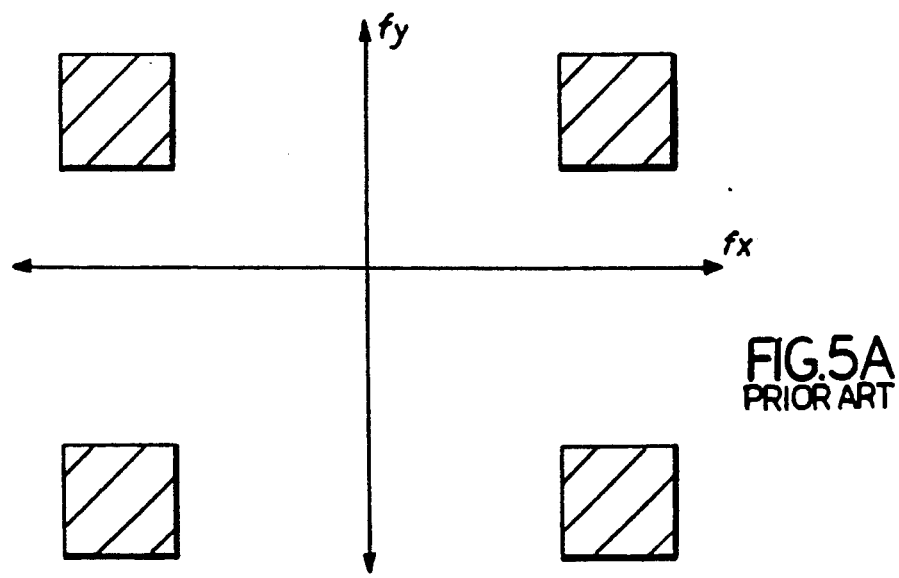
FIG. 5A is the two dimensional spatial frequency response of the cascaded filter used in FIG. 5 for recovering chroma.

An improved, yet still conventional, separation algorithm uses a separable bandpass filter to recover the chrominance signal. As shown in FIG. 5, a horizontal bandpass filter is followed by a two-tap vertical "comb filter". FIG. 5A shows the resulting two dimensional spatial frequency response of this cascade of filters. The two dimensional filtering results in a better chrominance signal with fewer cross effects.

Film is commonly converted for NTSC video transmission by a procedure known as "3-2 pull-down." Film standards specify a frame rate of 24 Hz, whereas NTSC requires 30 frames per second, with each frame divided into two interlaced fields to produce 60 fields per second. Thus, to convert film to NTSC requires a frame rate conversion. Each pair of film frames is transformed to five NTSC fields; three NTSC fields are generated from one parity (e.g., even) film frames, and two NTSC fields from the other parity (e.g., odd) film frames.

A segment of the resulting NTSC transmission, with film frames and NTSC fields identified, is shown in FIG. 7. The fields are shown in "end view", with each solid dot representing a full line of the NTSC field. The first field, numbered 0 in FIG. 7, contains every other line of the image; the second field (numbered 1), which is interlaced with the first, contains the remaining lines. The phase of the color subcarrier is also shown in FIG. 7 (0 radians is denoted by "+", and x radians by "−"). Because the color subcarrier is an odd multiple of half the line rate, the phase of the color subcarrier reverses between lines in a field. And, because of the number of lines in a field, the phase also reverses from one NTSC frame to the next, as shown.

The procedures used for the separation are shown in FIGS. 8 and 9. Turning first to FIG. 8, luma (Y) for lines of fields 0 and 2 can be recovered perfectly by summing corresponding lines a, b in the two fields and dividing the sum by two. Chroma (C) for fields 0 and 2 can similarly be recovered perfectly by forming the difference between corresponding lines a, b and dividing by two. Chroma (C) for lines of field 1 is approximated by interpolating between the chroma computed for nearest neighbors in fields 0 and 2; thus, the chroma for line d in field 1 is assumed to be the average of the chroma values $C_1$ through $C_4$. The luma for line d of field 2 is approximated by subtracting out the approximate chroma value; because of the change in polarity of chroma, that step is accomplished by adding the approximate chroma value to line d.

The procedures for handling the two-field case are shown in FIG. 9. Chroma (C) for lines a, b is approximated by forming the difference between nearest lines a, b in fields 3 and 4, and then dividing the difference by two. Another possibility would be using lines a and d (essentially the conventional 2D separation scheme), but this would produce less resolution and more cross-luma than using samples a and b, since samples a and b are closer vertically than samples a and d, and thus are likely to have closer luma values. Luma (Y) is approximated by subtracting out the chroma approximation.

Figure 10:
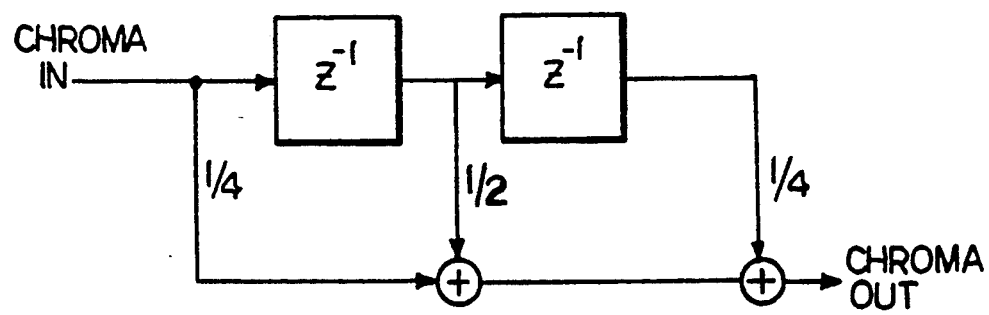
FIG. 10 shows a vertical chroma filter for improving picture quality in the two-field case.

Because the two-field case produces images with identical chroma in adjacent lines (lines from adjacent fields being interlaced in the displayed image) it is preferable to apply some vertical chroma filtering. This will reduce chroma bandwidth but improve overall picture quality, by reducing such artifacts as jaggedness of diagonal edges. A suitable vertical filter is shown in FIG. 10.

In those cases where approximations of chroma and luma are calculated, there will be, of course, some cross-luma, but it will be smaller than the cross-luma resulting from the conventional 2-dimensional (2D) filtering shown in FIG. 5. Further reductions in cross-luma can be achieved with adaptive filters. For the next pair of film frames (not shown), the fields reverse parity, and similar procedures apply.

Horizontal bandpass filtering similar to that used in conventional NTSC chroma separation should be used in conjunction with the invention, to further reduce cross-luma and cross-chroma. Such filtering should be used in both the three-field and two-field cases to reduce luma-chroma separation error resulting from channel noise. Such filtering has the further benefit in the two-field case, of reducing the separation error inherent in the approximate rules used in the separation.

Figure 6:
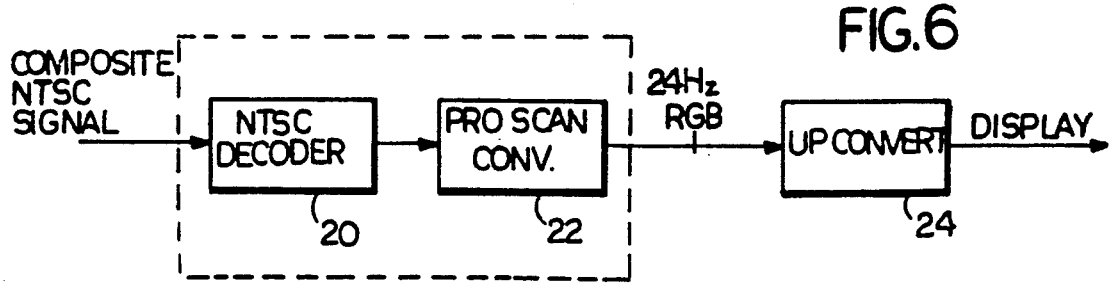
FIG. 6 is a block diagram of the preferred embodiment of the invention.

Combining this newly developed NTSC decoding procedure with the interlace-to-progressive procedures disclosed in pending U.S. application Ser. No. 07/471,532 (filed Jan. 29, 1990, entitled Adaptive Modulation Demodulation Video Signal Processing), and with an upconversion scheme, will yield very good quality pictures for screen display. As shown in FIG. 6, NTSC decoder 20 (which embodies the chroma separation rules of the invention) is connected to progressive scan converter 22, the output of which is supplied to upconverter 24.

Other embodiments are within the following claims. For example, it may be preferable in some circumstances to use the two-field rules for the three-field case, so that the same chroma separation rules are used for all frames. This will degrade chroma separation in the three-field case, but is one way of eliminating the "flicker" that may result from constantly switching between decoding rules.

What is claimed is:

1. A method for separating the luminance and chrominance components of a television signal in which material having a frame rate other than that of the standard rate of the television signal has been converted to the standard rate of the television signal by generating successive fields of the television signal from the same frame of the material, wherein the material is film recorded at 24 frames/second, said television signal conforms to the NTSC standard of 60 fields/second, and the conversion is done by the 3-2 pull-down method, so that for every pair of adjoining film frames, one frame provides image lines for three successive NTSC fields, and the other frame provides image lines for two successive NTSC fields.

said method comprising the steps of:

separating the chrominance component by forming a first arithmetic combination of lines from two or more of said successive fields in such a manner as to cancel or reduce contributions from the other of the components, thereby leaving predominantly the desired component;

separating the luminance component by forming a second arithmetic combination of lines from two or more of said successive fields in such a manner as to cancel or reduce contributions from the chrominance component, thereby leaving predominantly the luminance component;

wherein said step of separating the chrominance component comprises, for the case of three successive NTSC fields being based on one film frame, generating the chrominance for lines of the first and third fields by forming the difference between corresponding lines from the first and third fields.

2. The method of claim 1 wherein said step of separating the chrominance component comprises, for the case of three successive NTSC fields being based on one film frame, generating the chrominance component for lines of the second field by interpolation from the chrominance generated for nearby lines in the first and third fields.

3. The method of claim 1 wherein said step of separating the luminance component comprises, for the case of three successive NTSC fields being based on one film frame, generating the luminance component for lines of the first and third fields by summing signals from the first and third fields.

4. The method of claim 3 wherein said step of separating the luminance component comprises, for the case of three successive NTSC fields being based on one film frame, generating the luminance component for lines of the second field by adding to those lines the chrominance interpolated for the lines.

5. The method of claim 3 wherein the sum is divided by two to provide the luminance component.

6. The method of claim 1 wherein said step of separating the chrominance component comprises, for the case of two successive NTSC fields being based on one film frame, approximating the chrominance component for lines of both fields as the difference between signals for nearby lines in different fields.

7. The method of claim 6 wherein said step of separating the luminance component comprises, for the case of two successive NTSC fields being based on one film frame, approximating the luminance component for lines of both fields by removing from any given line the approximated chrominance component.

8. The method of claim 1 wherein the difference is divided by two to provide the chrominance component.

9. A method for separating the luminance and chrominance components of a television signal in which material having a frame rate other than that of the standard rate of the television signal has been converted to the standard rate of the television signal by generating successive fields of the television signal from the same frame of the material, wherein the material is film recorded at 24 frames/second, said television signal conforms to the NTSC standard of 60 fields/second, and the conversion is done by the 3-2 pull-down method, so that for every pair of adjoining film frames, one frame provides image lines for three successive NTSC fields, and the other frame provides image lines for two successive NTSC fields, said method comprising the steps of:

separating the chrominance component by forming a first arithmetic combination of lines from two or more of said successive fields in such a manner as to cancel or reduce contributions from the other of the components, thereby leaving predominantly the desired component;

separating the luminance component by forming a second arithmetic combination of lines from two or more of said successive fields in such a manner as to cancel or reduce contributions from the chrominance component, thereby leaving predominantly the luminance component;

wherein said step of separating the luminance component comprises, for the case of three successive NTSC fields being based on one film frame, generating the luminance component for lines of the first and third fields by summing signals from the first and third fields.

10. The method of claim 9 wherein the same is divided by two to provide the luminance component.

* * * * *

UNITED STATES PATENT AND TRADEMARK OFFICE
CERTIFICATE OF CORRECTION

PATENT NO. : 5,161,006

DATED : 11/3/92

INVENTOR(S) : Peter A. Monta et al.

It is certified that error appears in the above-identified patent and that said Letters Patent is hereby corrected as shown below:

TITLE PAGE

Under [56] References Cited, U.S. PATENT DOCUMENTS:

Application No. 421,152, the date "10/1889" should be --10/1989--.

Application No. 459,289, the date "12/1889" should be --12/1989--.

Column 6, line 42, "same" should be --sum--.

Signed and Sealed this

Twelfth Day of October, 1993

Attest:

BRUCE LEHMAN

Attesting Officer

Commissioner of Patents and Trademarks